United States Patent [19]
Sausen

[11] 3,886,197
[45] May 27, 1975

[54] ORGANIC NITROGEN-FLUORINE COMPOUNDS AND THEIR PREPARATION

[75] Inventor: George N. Sausen, Wilmington, Del.

[73] Assignee: E. I. du Pont de Nemours and Company, Wilmington, Del.

[22] Filed: Sept. 12, 1961

[21] Appl. No.: 137,507

[52] U.S. Cl.... 260/465.5 R; 260/465 D; 260/465 E; 260/465.4; 260/471 R; 260/482 R; 260/534 R; 260/544 R; 260/544 F; 260/561 A; 260/561 N; 260/561 HL; 260/566 D; 260/570.5 P; 260/583 NH
[51] Int. Cl.............. C07c 121/42; C07c 121/60
[58] Field of Search............ 260/561, 465.4, 465 D, 260/465 E, 465.5, 583 B, 534, 566 D, 583 NH, 570.5 PA;561 A, 561 N, 561 HL, 465.4, 465 D, 465 E, 465.5 R, 534 R, 482 R, 471 R

[56] References Cited
UNITED STATES PATENTS
| | | | |
|---|---|---|---|
| 3,239,518 | 3/1966 | Winberg | 260/465.5 R X |
| 3,347,898 | 10/1967 | Peterson | 260/465.5 R |
| 3,439,017 | 4/1969 | Stevens | 260/570.5 PA X |
| 3,700,708 | 10/1972 | Petry | 260/465.5 R X |

Primary Examiner—Joseph P. Brust

[57] ABSTRACT

Dinitrogen tetrafluoride reacts with internally unsaturated acetylenes, e.g., hexafluoro-2-butyne, to produce isomeric fluoroimino fluoro amines and fluoro diamines, e.g.,

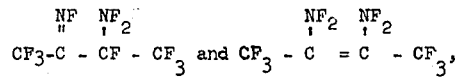

that can be used as high-energy propellants.

20 Claims, No Drawings

ORGANIC NITROGEN-FLUORINE COMPOUNDS AND THEIR PREPARATION

This invention relates to, and has as its principal objects provision of, novel compositions of matter containing nitrogen and fluorine and a method for the preparation of the same.

Compounds containing nitrogen-fluorine (N—F) bonds are of interest as high-energy propellants, polymerization initiators and intermediates in chemical syntheses. Relatively few N–F compounds of any kind have been reported and it is therefore desirable to extend knowledge of this field. Known organic N—F compounds are for the most part highly fluorinated, and very few such compounds with more than one N—F moiety are known.

It has now been found that compounds containing N—F moieties on adjoining carbon atoms can be prepared by reacting dinitrogen tetrafluoride ($N_2F_4$) with disubstituted acetylenes. The reaction can be represented by equation (1):

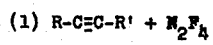
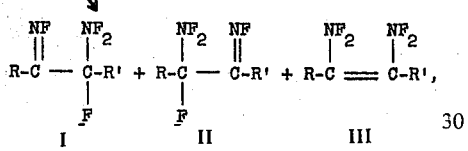

and the products of this invention are the isomeric compounds depicted by formulas I, II, and III, where R and R' are the same or different, contain no ethylenic unsaturation, are free from halogens other than those of atomic number 9–17 (fluorine and chlorine), and are selected from the group consisting of: hydrocarbyl (hydrocarbon, e.g., ethyl, cyclohexyl, tetramethyl-n-propyl, 1-naphthylmethyl, dodecyl), halohydrocarbyl (e.g., 2,2-difluoroethyl, 4-fluorobutyl, 3-fluorobenzyl, 12-chlorododecyl), nitrohydrocarbyl (e.g., 4-nitrophenyl, 2-nitrophenylethynyl), carboxyhydrocarbyl (e.g., carboxymethyl, 2-carboxy-4-hexynyl, 4-carboxyphenyl, 10-carboxydecyl);

Further: carboxyl, halocarbonyl,

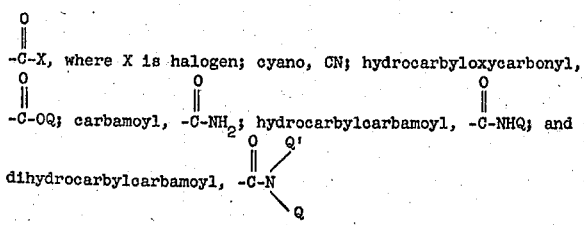

where Q and Q' are the same or different monovalent hydrocarbyl groups (e.g., methyl, tertbutyl, cycloheptyl, 2-naphthyl, dodecyl), and where, in the formula

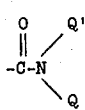

Q and Q' can be joined together to form a divalent hydrocarbyl group (e.g., ethylene, 2,5-dimethylhexamethylene, 3-phenylpentamethylene).

Still further: halocarbonylhydrocarbyl,

cyanohydrocarbyl, —R''—CN; hydrocarbyloxycarbonylhydrocarbyl,

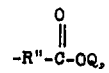

carbamoylhydrocarbyl,

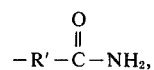

hydrocarbyl-carbamoylhydrocarbyl,

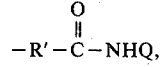

and dihydrocarbylcarbamoylhydrocarbyl,

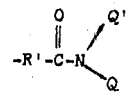

where X, Q, and Q' are as above and R'' is divalent hydrocarbyl such as methylene, undecamethylene, 2-butynylethylene, 1,3-phenylene, and the like.

Additional specific groups illustrative of the last two paragraphs are methoxycarbonyl, isopropylcarbamoyl, 4-methylphenoxycarbonyl, azacyclododecane-1-carbonyl, ethoxycarbonylmethyl, 4-chlorocarbonylbutyl, 2-phenoxycarbonylethyl, 11-carbamoylundecyl and the like.

Because of easy availability and high reactivity, a preferred class of products comprises those defined above in which R and R' each contain 1–12 carbons. An especially preferred class is that in which R and R' are the same or different and are hydrocarbyl, halohydrocarbyl, carbamoyl, hydrocarbylcarbamoyl, or dihydrocarbylcarbamoyl groups of 1–12 carbons; cyano; or halocarbonyl.

The process of this invention leads to a mixture of the isomeric products I, II, and III, When R and R' are the same, products I and II are identical. In addition, product III can exist in the form of cis and trans isomers. The relative amounts of products I, II, and III (or I and III) vary, depending on the acetylenic reactant and the reaction conditions, especially temperature.

Generically, products I and II can be named as fluoroimino fluoro amines; product III, as a fluoro diamine. As a specific example, the products I, II, and III from methylphenylacetylene ($R = CH_3, R' = C_6H_5$) can be named N,N,1-trifluoro-2-fluoroimino-1-phenylpropylamine, N,N,1-trifluoro-2-fluoroimino-2-phenylisopropylamine, and N,N,N',N'-tetrafluoro-1-phenyl-1,2-propenediamine, respectively. For convenience, the products are represented hereinafter by structural formulas.

The mole ratio of reactants in the process of this invention is not critical. Usually an approximately 1:1 mole ratio is used, in accord with the stoichiometry of equation (1). An excess of either reactant can be used if desired, for example, to effect essentially complete conversion of the other reactant. Excess $N_2F_4$ is easily removed from the product mixture by virtue of its volatility (b.p. −73°C.).

A solvent is not required, but a solvent inert to the reactants and products may be used if desired. Use of a solvent is advantageous when the acetylenic reactant is a solid. Suitable solvents include hydrocarbons and fluorinated or chlorinated hydrocarbons, such as benzene, heptane, cyclohexane, petroleum ether, chlorobenzene, carbon tetrachloride, hexafluoropropene dimer, 1,2-dichloroethane, 1,1,1-trichloroethane, and 1,1,2-trichloro-1,2,2-trifluoroethane.

The reaction temperature is likewise not critical. The preferred range is 25°–225°C. The reaction proceeds at temperatures below 25°C., but usually at too slow a rate to be of practical value. Temperatures from 225°C. up to the decomposition point of the product can be used if desired, but no advantage results.

The process is conveniently carried out at the autogenous pressure of the reactants in a closed vessel equipped with means of agitation and of measuring internal pressure. The inner surface of the vessel is resistant to chemical attack by nitrogen fluorides and hydrogen fluoride. Surfaces of stainless steel and Hastelloy C are suitable. Hastelloy C is the trade name of a well-known alloy of nickel, iron, and molybdenum.

The time required for the process varies with the acetylenic reactant and the temperature. The course of the reaction can be followed by observing the pressure drop as the reactants combine. When the pressure no longer falls, the reaction is complete. Under the preferred conditions, reaction is usually complete in one-half to 6 hours. The products are separated by known procedures such as distillation or preparative-scale gas chromatography and filtration and recrystallization in the case of solids.

The products of this invention are distillable liquids or crystallizable solids. They are stable to air and moisture except when the groups R or R' or both contain functions, e.g., fluorocarbonyl,

that are not stable to one or both of these agents. They are soluble in common solvents such as carbon tetrachloride, petroleum ether, benzene, heptane, acetone, and ethyl ether. They are sensitive to, and can be caused to detonate by, static electricity and physical shock.

The products and process of this invention are illustrated by the following examples, in which all parts are by weight and pressures autogenous unless otherwise indicated.

EXAMPLE 1

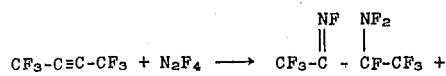

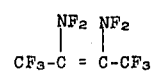

To a Hastelloy C-lined shaker tube with a volume equal to that of 80 parts of water were charged 10 parts of hexafluoro-2-butyne and 11.7 parts of $N_2F_4$. The tube was heated at 170° for 1 hour with shaking. The mixture was distilled into a cylinder cooled at −196°C., and unreacted starting materials were volatilized from the mixture at −78°, after which the liquid residue amounted to 15.9 parts. Gas-chromatographic analysis of this liquid showed it to be principally (92%) a 58/42 mixture of trans/cis isomers of

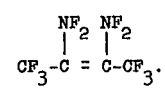

A minor amount (1%) of the isomeric

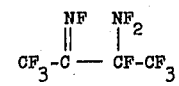

was also present.

The trans and cis isomers were separated and purified by preparative-scale gas chromatography. The trans isomer was obtained as a colorless liquid, b.p. 49°C. Mass spectrometic analysis showed m/e 247$^+$ as the largest fragment (parent-1F), and infrared analysis showed major absorption bands at 8.25$\mu$ (C—F) and 11.2 and 11.4$\mu$ (N—F). Fluorine n-m-r (nuclear magnetic resonance) showed two resonance peaks in a ⅔ area ratio at −6347 cps. and −527 cps. (56.4 mc., 1,2-dichlorotetrafluoroethane=O). The cis isomer was also obtained as a colorless liquid, b.p. 56°C. Molecular-weight determination by the gas-density method gave a value of 271; calc'd. 266. The infrared spectrum showed absorption bands for C-F (8.0$\mu$) and N—F (11.35, 11.75$\mu$) and also a 6.15$\mu$ band for carbon-carbon unsaturation. Fluorine n-m-r showed two peaks in a ⅔ area ratio at −6510 cps. and −396 cps. (56.4 mc., 1,2-dichlorotetrafluoroethane=O) in agreement with the above structure.

The isomeric product

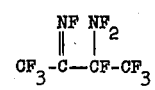

was obtained as a colorless liquid, b.p. 47°C.

Anal. Calc'd. for $C_4F_{10}N_2$: F, 71.4; M.W., 266.
Found: F, 71.30; M.W., 268.
71.56

Infrared absorption showed C-F (8–8.25$\mu$), N-F (10.5–11.5$\mu$), and C=NF (6.15$\mu$). Fluorine n-m-r showed five resonance peaks at −5045, −3610, −55, +356, and +4153 cps. (40 mc., 1,2-dichlorotetrafluoroethane=O), in agreement with the above structure.

The hexafluoro-2-butyne of this and the next succeeding example was obtained by the reaction of 2,3-dichlorohexafluoro-2-butene with zinc by the method of U.S. Pat. No. 2,546,997.

EXAMPLE 2

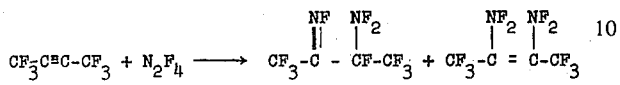

The shaker tube of Example 1 was charged with 9 parts of hexafluoro-2-butyne and 5.6 parts of $N_2F_4$, and the tube was heated at 190°–198° for 4 hours with shaking. The products were isolated as in Example 1. The principal product obtained from this reaction was a colorless liquid boiling at 47°C. Gas-chromatographic analysis showed it to be a mixture of $$\begin{matrix} & NF & NF_2 \\ & \| & | \\ CF_3-C & - & CF-CF_3 \end{matrix}$$

(90%) and trans—$CF_3$—$C(NF_2)=C(NF_2)$—$CF_3$ (10%).

EXAMPLE 3

$$NC-C\equiv C-CN + N_2F_4 \longrightarrow \underset{\underset{NC-C-CF-CN}{\| \ |}}{NF \ NF_2} + \underset{\underset{NC-C = C-CN}{| \ |}}{NF_2 \ NF_2}$$

The shaker tube of Example 1 was charged with 3.6 parts of dicyanoacetylene and 10.4 parts of $N_2F_4$, and the tube was heated at 140° for 3.5 hours with shaking. The gaseous product consisted largely of unchanged $N_2F_4$; the liquid product amounted to 5.1 parts. Gas-chromatographic analysis of this liquid showed it to contain $$\begin{matrix} & NF & NF_2 \\ & \| & | \\ NC-C & - & CF-CN \end{matrix}$$

as a principal component. This product was separated and purified by preparative-scale gas chromatography to give $$\begin{matrix} & NF & NF_2 \\ & \| & | \\ NC-C & - & CF-CN \end{matrix}$$

as a colorless liquid, b.p. 82°C.

Anal. Calc'd. for $C_4F_4N_4$: N, 31.1; F, 42.2.
Found: N, 30.80; F, 41.89.

Fluorine n-m-r showed peaks at −8680 cps., a doublet at −5634, −5620 cps., and a triplet peak centered at +3949 cps. (56.4 mc., 1,2-dichlorotetrafluoroethane=O) in agreement with the above structure. Infrared analysis showed saturated C—N (4.42μ) and C=NF (6.22μ). Analytical gas chromatography indicated that the product contained 5–10% of the isomeric $$\begin{matrix} & NF_2 & NF_2 \\ & | & | \\ NC-C & = & C-CN. \end{matrix}$$

EXAMPLE 4

$$C_6H_5-C\equiv C-C_6H_5 + N_2F_4 \longrightarrow \underset{\underset{C_6H_5-C-CF-C_6H_5}{\| \ |}}{NF \ NF_2} + \underset{\underset{C_6H_5-C = C-C_6H_5}{| \ |}}{NF_2 \ NF_2}$$

A shaker tube like that of Example 1 was charged with 8.5 parts of diphenylacetylene, 29 parts of hexafluoropropene dimer, and 5.2 parts of $N_2F_4$. The tube was sealed, heated at 100° for 3 hours with shaking, allowed to come to room temperature, and opened. The brown liquid product was decolorized by filtering it through acid-washed alumina with the help of petroleum ether. The solvent was evaporated and the residue was distilled to give 4.6 parts (34%) of a mixture of $$\begin{matrix} & NF & NF_2 \\ & | & | \\ C_6H_5-C & - & CF-C_6H_5 \end{matrix}$$

with a minor proportion of $$\begin{matrix} & NF_2 & NF_2 \\ & | & | \\ C_6H_5-C & = & C-C_6H_5, \end{matrix}$$

as a yellow liquid, b.p. 98° (0.3 mm.); $n_D^{25}$, 1.5272.

Anal. Calc'd. for $C_{14}H_{10}N_2F_4$:
C, 59.57; H, 3.58; F, 26.93; N, 9.92
Found: C, 60.69; H, 4.33; F, 26.91; N, 9.91

Fluorine n-m-r showed a single peak at −5934 cps. (C=NF), a weak-strong-weak pattern at −5800, −5228, −5076, −4501 cps. (C—NF₂) and a peak at +5098 cps.

(⊖C-F)

(56.4 mc.; 1,2-dichlorotetrafluoroethane=O).

EXAMPLE 5

$$C_6H_5-C\equiv C-CF + N_2F_4 \rightarrow \underset{\underset{C_6H_5-C-CF-COF}{\| \ |}}{\overset{O}{\|} \quad NF \ NF_2} + \underset{\underset{C_6H_5-CF-C-COF}{| \ \|}}{NF_2 \ NF}$$

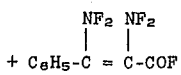

The shaker tube of Example 1 was charged with 11.7 parts of phenylpropiolyl fluoride and 9.2 parts of N₂F₄. The tube was sealed, heated at 70° for 2 hours, allowed to come to room temperature, and opened. On distillation of the brown, liquid product there was obtained 13 parts (55%) of a mixture of

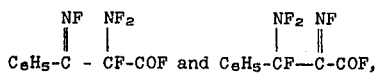

together with a minor proportion of

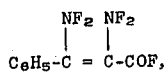

as a colorless liquid, b.p. 67°–68° (6.0 mm.), which was sensitive to moist air because of the —COF group but was stable under an atmosphere of nitrogen. The infrared absorption spectrum showed maxima at 5.36μ

and 6.12μ (C=NF).

Fluorine n-m-r showed a peak at —6896 cps. (C=NF), a peak at —6475 cps.

each of them split into doublets by each other, a weak-strong-strong-weak pattern at —5760, —5164, —5104, —4580 cps. (C—NF₂) and a peak at +4985 cps.

(56.4 mc.; 1,2-dichlorotetrafluoroethane=0).

An anilide, in which the —COF groups were replaced by —CONHC₆H₅ groups, was prepared by adding aniline to an ether solution of the mixture; m.p. 166.5°–167.5°, after recrystallization from cyclohexane.

Anal. Calc'd. for C₁₅H₁₁N₃F₄O:
C, 55.38; H, 3.41; N, 12.92; F, 23.36
Found: C, 55.64; H, 3.72; N, 12.56; F, 23.17

Similarly, the —COF groups can be converted to other types of carbamoyl groups by reaction with ammonia or other amines. For example, ammonia converts the —COF groups to —CONH₂ groups; dimethylamine, to —CON(CH₃)₂ groups; and hexamethylenimine, to

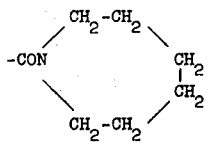

groups.

EXAMPLE 6

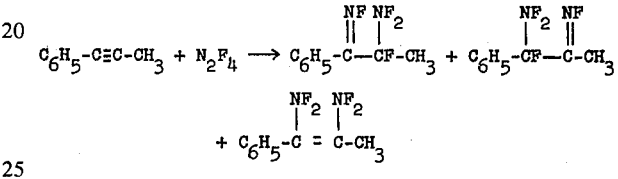

A Hastelloy C-lined shaker tube with a volume equal to that of 240 parts of water was charged with 21.0 parts of methylphenylacetylene and 19.5 parts of N₂F₄. The tube was sealed, heated at 85° with shaking for 3 hours, allowed to cool to room temperature, and opened. The brown, viscous product was distilled to give 13.3 parts (32%) of a mixture of

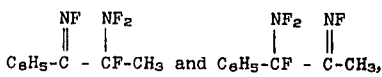

together with a minor proportion of

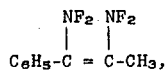

as a colorless liquid, b.p. 74°–76° (3.0 mm.)

Anal. Calc'd. for C₉H₈N₂F₄:
C, 49.10; H, 3.67; N, 12.72; F, 34.53
Found: C, 49.71; H, 3.77; N, 12.71; F, 34.46

Fluorine n-m-r showed a single peak at −5875 cps. (C=NF), a weak-strong-strong-weak pattern at −5925, −5355, −5251, −4679 cps. (C—NF₂), and a peak at +5199 cps. split into a triplet

which correspond to the isomer

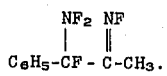

Peaks at −6135 cps., −5291 cps., and +4128 cps. are attributed to the other isomers (56.4 mc.; 1,2-dichlorotetrafluoroethane=O).

EXAMPLE 7

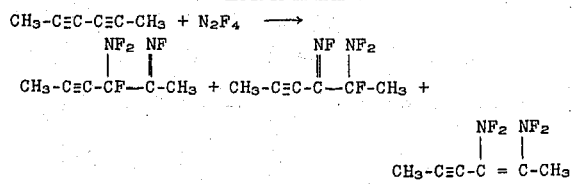

The shaker tube of Example 6 was charged with 12.5 parts of dimethyldiacetylene, 23 parts of carbon tetrachloride, and 19 parts of N₂F₄. The tube was sealed, heated at 70°C. for 3 hours, and allowed to come to room temperature. The solvent was evaporated, and the dark-brown residue was distilled to give 12.3 parts (42.5%) of a mixture of

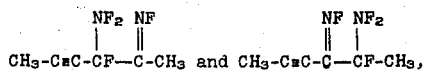

together with a minor proportion of

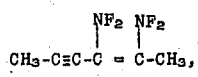

as a colorless liquid, b.p. 72°–73° (27 mm.); $n_D^{25}$, 1.4041. The infrared absorption spectrum had a maximum at 4.4μ (C ≡ C).

Anal. Calc'd. for C₆H₆N₂F₄:
    C, 39.56; H, 3.32; N, 15.38; F, 41.73
    Found: C, 40.11; H, 3.21; N, 15.71; F, 41.32

EXAMPLE 8

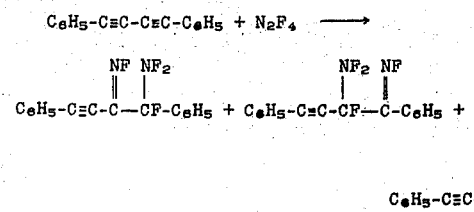

The shaker tube of Example 1 was charged with 5.0 parts of diphenyldiacetylene, 15 parts of carbon tetrachloride, and 3.5 parts of N₂F₄. The tube was sealed, heated at 75° for 3 hours, and allowed to come to room temperature overnight. The solvent was evaporated and the residue distilled to give a mixture of

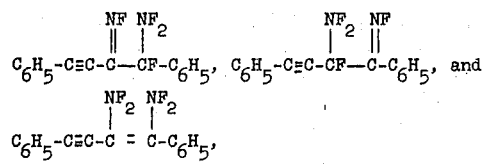

as a yellow liquid, b.p. 140°C. (0.4 mm.). The infrared absorption spectrum had a maximum at 4.5μ (C≡C).

EXAMPLE 9

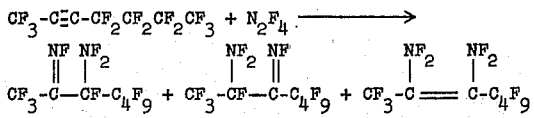

The shaker tube of Example 1 was charged with 10.0 parts of perfluoro-2-heptyne, 15 parts of a blend of completely halogenated chlorofluorocarbons, and 8.7 parts of N₂F₄, and the tube was heated at 186° for 3 hours with shaking. The volatile liquid product was separated by distillation from the higher-boiling chlorofluorocarbon oil; it amounted to 8.7 parts of

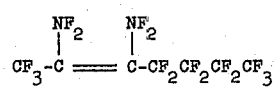

together with minor amounts of

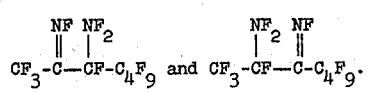

The major product was separated and purified by preparative-scale gas chromatography to give

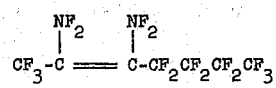

as a colorless liquid, b.p. 114°C.

Anal. Calcd. for C₇F₁₆N₂: F, 73.0
    Found: F, 73.34

Fluorine n-m-r showed seven peaks at −6445 cps. (C—NF₂), −6374 cps. (C—NF₂), −573 cps. (CF₃), +913 cps. (CF₃), and peaks at +2106, +3015, and +3418 cps. for CF₂ groups (56.4 mc., 1,2-difluorotetrachloroethane=O) in agreement with the above structure. Infrared analysis showed principal absorption bands at 8–8.5$\mu$ (C-F) and 11.25$\mu$ (N—F) with weak absorption in the C=C region (6$\mu$), also in agreement with the above structure.

The perfluoro-2-heptyne used in this example was prepared as follows:

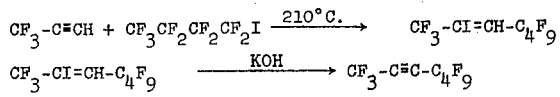

$$CF_3-C\equiv CH + CF_3CF_2CF_2CF_2I \xrightarrow{210°C.} CF_3-CI=CH-C_4F_9$$
$$CF_3-CI=CH-C_4F_9 \xrightarrow{KOH} CF_3-C\equiv C-C_4F_9$$

A mixture of 69 parts of trifluoromethylacetylene (made from propiolic acid and $SF_4$ by the method of Hasek, Smith, and Engelhardt, J. Am. Chem. Soc. 82, 543 (1960)) and 275 parts of perfluoro-n-butyl iodide (commercially available) was heated for 10 hours at 210°C. and autogenous pressure in a stainless-steel reactor. Distillation of the mixture gave 325 parts of crude product. Precision distillation gave 200 parts of 3-hydro-2-iodoperfluoro-2-heptene, b.p. 108°–116°C., $n_D^{25}$ 1.3511. The latter was added dropwise over one hour and 54 minutes to 158 parts of powdered potassium hydroxide in a glass reactor at 85°–90°C. The temperature was then raised to 115°C. over a period of 45 minutes. The crude product (110 parts) distilled from the mixture during the addition and subsequent heating. It was purified by precision distillation to give 20 parts of perfluoro-2-heptyne boiling at 54°–56°C.

The products and process of this invention have been illustrated by the foregoing specific examples. However, the invention is generic to all the products defined by the formulas I, II, and III on page 1. Additional examples of the products, together with the acetylenic reactants from which they can be prepared, are shown in the following table:

TABLE

| Acetylenic Reactant | Products |
|---|---|
| $(CH_3)_3C-C\equiv C-C(CH_3)_3$ | $(CH_3)_3C-\underset{NF}{\overset{NF}{C}}=\underset{NF_2}{\overset{NF_2}{C}}-C(CH_3)_3 + (CH_3)_3C-\underset{NF_2}{\overset{NF_2}{C}}=\underset{NF}{\overset{NF}{C}}-C(CH_3)_3 + (CH_3)_3C-\underset{NF_2}{\overset{NF_2}{C}}=\underset{NF_2}{\overset{NF_2}{C}}-C(CH_3)_3$ |
| $n-C_{11}H_{23}-C\equiv C-CH_3$ | $n-C_{11}H_{23}-\underset{NF}{\overset{NF}{C}}-\underset{NF_2}{\overset{NF_2}{CF}}-CH_3 + n-C_{11}H_{23}-\underset{NF_2}{\overset{NF_2}{CF}}-\underset{NF}{\overset{NF}{C}}-CH_3 + n-C_{11}H_{23}-\underset{NF_2}{\overset{NF_2}{C}}=\underset{NF_2}{\overset{NF_2}{C}}-CH_3$ |
| cyclobutyl-CH—C≡C—CH$_3$ | (corresponding three isomeric NF/NF$_2$ addition products) |
| $C_6H_5CH_2-C\equiv C-C_6H_5$ | $C_6H_5CH_2-\underset{NF}{\overset{NF}{C}}-\underset{NF_2}{\overset{NF_2}{CF}}-C_6H_5 + C_6H_5CH_2-\underset{NF_2}{\overset{NF_2}{CF}}-\underset{NF}{\overset{NF}{C}}-C_6H_5 + C_6H_5CH_2-\underset{NF_2}{\overset{NF_2}{C}}=\underset{NF_2}{\overset{NF_2}{C}}-C_6H_5$ |
| $CH_3-C\equiv C-(CH_2)_3-C\equiv C-CH_3$ | $CH_3-C\equiv C-(CH_2)_3-\underset{NF_2}{\overset{NF}{C}}-\underset{NF_2}{\overset{NF_2}{CF}}-CH_3 + CH_3-C\equiv C-(CH_2)_3-\underset{NF_2}{\overset{NF_2}{CF}}-\underset{NF}{\overset{NF}{C}}-CH_3 + CH_3-C\equiv C-(CH_2)_3-\underset{NF_2}{\overset{NF_2}{C}}=\underset{NF_2}{\overset{NF_2}{C}}-CH_3$ |
| $CH_3-C\equiv C-CF_3$ | $CH_3-\underset{NF}{\overset{NF}{C}}-\underset{NF_2}{\overset{NF_2}{CF}}-CF_3 + CH_3-\underset{NF_2}{\overset{NF_2}{CF}}-\underset{NF}{\overset{NF}{C}}-CF_3 + CH_3-\underset{NF_2}{\overset{NF_2}{C}}=\underset{NF_2}{\overset{NF_2}{C}}-CF_3$ |
| $CH_3-C\equiv C-(CH_2)_4Cl$ | $CH_3-\underset{NF}{\overset{NF}{C}}-\underset{NF_2}{\overset{NF_2}{CF}}-(CH_2)_4Cl + CH_3-\underset{NF_2}{\overset{NF_2}{CF}}-\underset{NF}{\overset{NF}{C}}-(CH_2)_4Cl + CH_3-\underset{NF_2}{\overset{NF_2}{C}}=\underset{NF_2}{\overset{NF_2}{C}}-(CH_2)_4Cl$ |
| $(CH_3)_2\underset{Cl}{C}-C\equiv C-\underset{Cl}{C}(CH_3)_2$ | $(CH_3)_2\underset{Cl}{C}-\underset{NF}{\overset{NF}{C}}-\underset{NF_2}{\overset{NF_2}{CF}}-\underset{Cl}{C}(CH_3)_2 + (CH_3)_2\underset{Cl}{C}-\underset{NF_2}{\overset{NF_2}{CF}}-\underset{NF}{\overset{NF}{C}}-\underset{Cl}{C}(CH_3)_2 + (CH_3)_2\underset{Cl}{C}-\underset{NF_2}{\overset{NF_2}{C}}=\underset{NF_2}{\overset{NF_2}{C}}-\underset{Cl}{C}(CH_3)_2$ |
| Cl—C$_6$H$_4$—C≡C—C$_6$H$_4$—Cl | Cl—C$_6$H$_4$—C(NF)=CF(NF$_2$)—C$_6$H$_4$—Cl + Cl—C$_6$H$_4$—C(NF$_2$)=C(NF$_2$)—C$_6$H$_4$—Cl |
| CF$_2$—CH$_2$—CH$_2$—CF$_2$ ring with CF$_2$—CH—C≡C—CH—CF$_2$ | corresponding NF/NF$_2$ addition products |
| O$_2$N—C$_6$H$_4$—C≡C—C$_6$H$_4$—NO$_2$ | O$_2$N—C$_6$H$_4$—C(NF)=CF(NF$_2$)—C$_6$H$_4$—NO$_2$ + O$_2$N—C$_6$H$_4$—C(NF$_2$)=C(NF$_2$)—C$_6$H$_4$—NO$_2$ |
| $CH_3-C\equiv C-COOH$ | $CH_3-\underset{NF}{\overset{NF}{C}}-\underset{NF_2}{\overset{NF_2}{CF}}-COOH + CH_3-\underset{NF_2}{\overset{NF_2}{CF}}-\underset{NF}{\overset{NF}{C}}-COOH + CH_3-\underset{NF_2}{\overset{NF_2}{C}}=\underset{NF_2}{\overset{NF_2}{C}}-COOH$ |
| $n-C_5H_{11}-C\equiv C-COCl$ | $n-C_5H_{11}-\underset{NF}{\overset{NF}{C}}-\underset{NF_2}{\overset{NF_2}{CF}}-COCl + n-C_5H_{11}-\underset{NF_2}{\overset{NF_2}{CF}}-\underset{NF}{\overset{NF}{C}}-COCl + n-C_5H_{11}-\underset{NF_2}{\overset{NF_2}{C}}=\underset{NF_2}{\overset{NF_2}{C}}-COCl$ |
| $(CH_3)_3CCH_2-C\equiv C-COOH$ | $(CH_3)_3CCH_2-\underset{NF}{\overset{NF}{C}}-\underset{NF_2}{\overset{NF_2}{CF}}-COOH + (CH_3)_3CCH_2-\underset{NF_2}{\overset{NF_2}{CF}}-\underset{NF}{\overset{NF}{C}}-COOH + (CH_3)_3CCH_2-\underset{NF_2}{\overset{NF_2}{C}}=\underset{NF_2}{\overset{NF_2}{C}}-COOH$ |
| $n-C_6H_{13}-C\equiv C-CONH_2$ | $n-C_6H_{13}-\underset{NF}{\overset{NF}{C}}-\underset{NF_2}{\overset{NF_2}{CF}}-CONH_2 + n-C_6H_{13}-\underset{NF_2}{\overset{NF_2}{CF}}-\underset{NF}{\overset{NF}{C}}-CONH_2 + n-C_6H_{13}-\underset{NF_2}{\overset{NF_2}{C}}=\underset{NF_2}{\overset{NF_2}{C}}-CONH_2$ |
| $CH_3-C\equiv C-(CH_2)_4CN$ | $CH_3-\underset{NF}{\overset{NF}{C}}-\underset{NF_2}{\overset{NF_2}{CF}}-(CH_2)_4CN + CH_3-\underset{NF_2}{\overset{NF_2}{CF}}-\underset{NF}{\overset{NF}{C}}-(CH_2)_4CN + CH_3-\underset{NF_2}{\overset{NF_2}{C}}=\underset{NF_2}{\overset{NF_2}{C}}-(CH_2)_4CN$ |

TABLE -- Continued

| Acetylenic Reactant | Products |
|---|---|
| n—C$_8$H$_{17}$—C≡C—(CH$_2$)$_{11}$COOCH$_3$ | n—C$_8$H$_{17}$—C(=NF)—CF(NF$_2$)—(CH$_2$)$_{11}$COOCH$_3$ + n—C$_8$H$_{17}$—CF(NF$_2$)—C(=NF)—(CH$_2$)$_{11}$COOCH$_3$ <br> + n—C$_8$H$_{17}$—C(NF$_2$)=C(NF$_2$)—(CH$_2$)$_{11}$COOCH$_3$ |
| (naphthyl)—C≡C—COOH | (naphthyl)—C(=NF)—CF(NF$_2$)—COOH + (naphthyl)—CF(NF$_2$)—C(=NF)—COOH + (naphthyl)—C(NF$_2$)=C(NF$_2$)—COOH |
| C$_2$H$_5$OOC—C≡C—COOC$_2$H$_5$ | C$_2$H$_5$OOC—C(=NF)—CF(NF$_2$)—COOC$_2$H$_5$ + C$_2$H$_5$OOC—C(NF$_2$)=C(NF$_2$)—COOC$_2$H$_5$ |
| (biphenyl)—C≡C—COOH | (biphenyl)—C(=NF)—CF(NF$_2$)—COOH + (biphenyl)—CF(NF$_2$)—C(=NF)—COOH <br> + (biphenyl)—C(NF$_2$)=C(NF$_2$)—COOH |

As shown in the following examples, the products of this invention are useful as polymerization initiators.

EXAMPLE A

A mixture of 10 parts of tetrafluoroethylene, 30 parts of perfluorodimethylcyclobutane solvent, and 0.03 part of

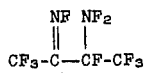
$$CF_3-C(=NF)-CF(NF_2)-CF_3$$

was heated at 145°–150°C. and autogenous pressure for five hours in a shaker tube similar to that of Example 1. A total of 8.3 parts (83%) of polytetrafluoroethylene was obtained as a white powder.

EXAMPLE B

A mixture of 13.8 parts of tetrafluoroethylene, 30 parts of perfluorodimethylcyclobutane, and 0.025 part of

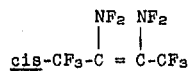
$$\underline{cis}\text{-}CF_3-C(NF_2)=C(NF_2)-CF_3$$

was heated at 107° for 4.5 hours, autogenous pressure, in a shaker tube like that of Example 1. A total of 9.0 parts (65%) of polytetrafluoroethylene was obtained as a white powder.

EXAMPLE C

A mixture of 0.21 part of ethylene and 0.013 part of trans-CF$_3$—C(NF$_2$)=C(NF$_2$)—CF$_3$ initiator was sealed in a collapsible platinum tube, and the tube was heated at 125° for four hours under 1000 atmospheres external pressure. A total of 0.08 part (38%) of polyethylene was obtained as a white powder. In a control experiment in the absence of the initiator, no polymer was obtained.

EXAMPLE D

A mixture of 10 parts of tetrafluoroethylene, 30 parts of perfluorodimethylcyclobutane, and 0.025 part of

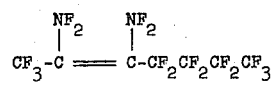
$$CF_3-C(NF_2)=C(NF_2)-CF_2CF_2CF_2CF_3$$

was heated at 111°C. for 3.17 hours at autogenous pressure in a shaker tube similar to that of Example 1. A total of 8.9 parts (89%) of polytetrafluoroethylene was obtained as a white powder.

Since obvious modifications and equivalents in the invention will be evident to those skilled in the chemical arts, I propose to be bound solely by the appended claims.

The embodiment of the invention in which an exclusive property or privilege is claimed are defined as follows:

1. A compound of the group consisting of

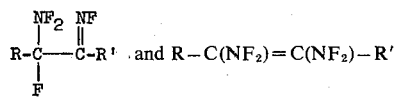
$$R-C(NF_2)-C(=NF)-R' \text{ and } R-C(NF_2)=C(NF_2)-R'$$
with F on the first carbon wherein R and R' are selected from the group consisting of hydrocarbon, halohydrocarbon, nitrohydrocarbon, carboxyhydrocarbon, halocarbonylhydrocarbyl, cyanohydrocarbyl, hydrocarbyloxycarbonylhydrocarbyl, carbamoylhydrocarbyl, hydrocarbylcarbamoylhydrocarbyl, dihydrocarbylcarbamoylhydrocarbyl, carboxyl, halocarbonyl, cyano, hydrocarbyloxycarbonyl, carbamoyl, hydrocarbylcarbamoyl and dihydrocarbylcarbamoyl, R and R' each containing 1–12 carbons and being free of ethylenic unsaturation and of halogen of atomic number greater than 17, and, in the second formula, both not being alkyl simultaneously.

2. A compound of the formula CF$_3$—C(NF$_2$)=C(NF$_2$)—CF$_3$.

3. The compound of the formula

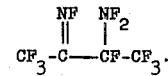
$$CF_3-C(=NF)-CF(NF_2)-CF_3.$$

4. A compound of the formula NC—C(NF$_2$)=C(NF$_2$)—CN.

5. The compound of the formula

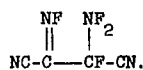

6. The compound of the formula

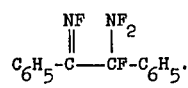

7. A compound of the formula C$_6$H$_5$—C(NF$_2$)=C(NF$_2$)—C$_6$H$_5$.

8. The compound of the formula

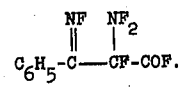

9. The compound of the formula

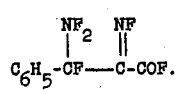

10. A compound of the formula C$_6$H$_5$—C(NF$_2$)=C(NF$_2$)—CH$_3$.

11. The compound of the formula

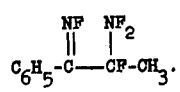

12. The compound of the formula

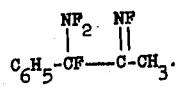

13. A compound of the formula CF$_3$—C(NF$_2$)=C(NF$_2$)—C$_4$F$_9$.

14. The process of preparing an organic compound containing nitrogen and fluorine which consists of reacting at a temperature of up to the product-decomposition temperature, N$_2$F$_4$ with an acetylenic compound of the formula R—C ≡ C—R' wherein R and R' are selected from the group consisting of hydrocarbon, halohydrocarbon, nitrohydrocarbon, carboxyhydrocarbon, halocarbonylhydrocarbyl, cyanohydrocarbyl, hydrocarbyloxycarbonylhydrocarbyl, carbamoylhydrocarbyl, hydrocarbylcarbamoylhydrocarbyl, dihydrocarbylcarbamoylhydrocarbyl, carboxyl, halocarbonyl, cyano, hydrocarbyloxycarbonyl, carbamoyl, hydrocarbylcarbamoyl and dihydrocarbylcarbamoyl, R and R' each containing 1–12 carbons and being free of ethylenic unsaturation and of halogen of atomic number greater than 17.

15. The process of preparing an organic compound containing nitrogen and fluorine which consists of reacting, at a temperature of up to the product-decomposition temperature, N$_2$F$_4$ with hexafluoro-2-butyne.

16. The process of preparing an organic compound containing nitrogen and fluorine which consists of reacting, at a temperature of up to the product-decomposition temperature, N$_2$F$_4$ with dicyanoacetylene.

17. The process of preparing an organic compound containing nitrogen and fluorine which consists of reacting, at a temperature of up to the product-decomposition temperature, N$_2$F$_4$ with methylphenylacetylene.

18. The process of preparing an organic compound containing nitrogen and fluorine which consists of reacting, at a temperature of up to the product-decomposition temperature, N$_2$F$_4$ with dimethyldiacetylene.

19. The process of preparing an organic compound containing nitrogen and fluorine which consists of reacting, at a temperature of up to the product-decomposition temperature, N$_2$F$_4$ with diphenyldiacetylene.

20. The process of preparing an organic compound containing nitrogen and fluorine which consists of reacting, at a temperature of up to the product-decomposition temperature, N$_2$F$_4$ with perfluoro-2-heptyne.

* * * * *

UNITED STATES PATENT OFFICE
CERTIFICATE OF CORRECTION

PATENT NO. : 3,886,197
DATED : May 27, 1975
INVENTOR(S) : George N. Sausen

It is certified that error appears in the above-identified patent and that said Letters Patent are hereby corrected as shown below:

Col. 2, lines 20, 25 and 30 - "R'" in each instance should be --R"--.

Col. 2, line 52 - Replace the comma after "III" with a period.

Col. 6, line 54 - Change "weak-strong-weak" to --weak-strong-strong-weak--.

Col. 10, line 17 - Change "C C" to --C≡C--.

Signed and Sealed this fourth Day of May 1976

[SEAL]

Attest:

RUTH C. MASON
Attesting Officer

C. MARSHALL DANN
Commissioner of Patents and Trademarks